Nov. 30, 1943.  A. GAZDA  2,335,504
GEAR TEETH
Filed Nov. 13, 1942
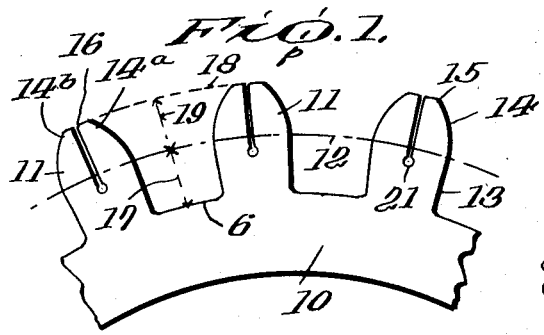
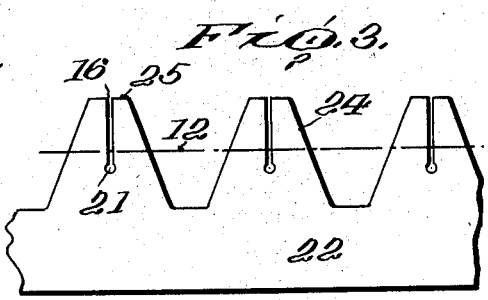
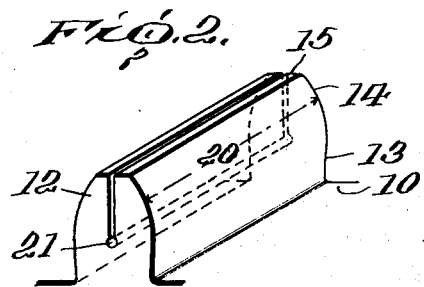
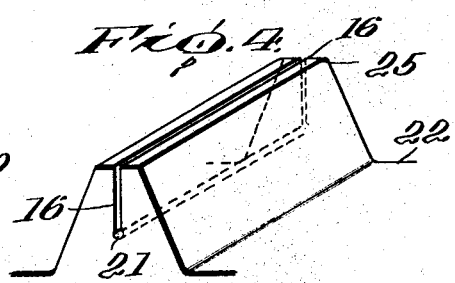
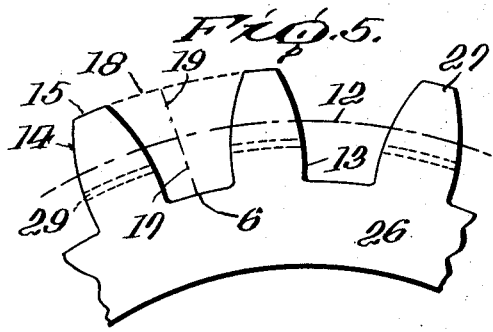
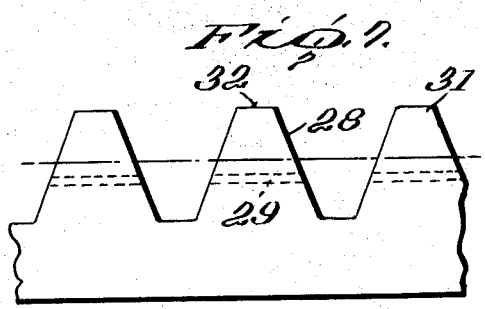
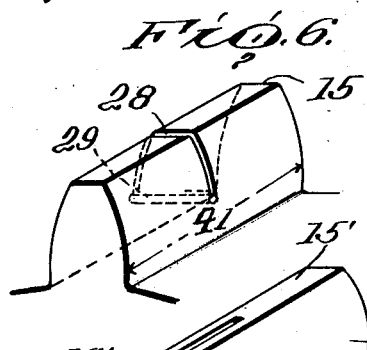
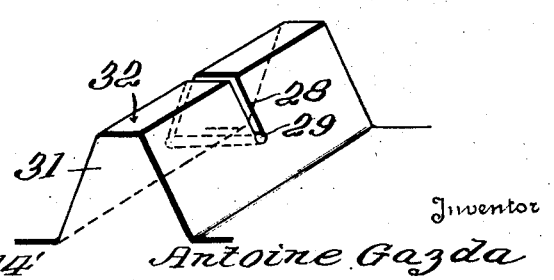
Inventor
Antoine Gazda
By C. F. Kenderoth
Attorney Patented Nov. 30, 1943

2,335,504

UNITED STATES PATENT OFFICE 2,335,504

GEAR TOOTH

Antoine Gazda, Providence, R. I.

Application November 13, 1942, Serial No. 465,496

6 Claims. (Cl. 74—462)

My invention relates to gear teeth, and more particularly concerns the construction of gear teeth of substantially all known types, which for example, but not by way of limitation, may be adapted for racks, segmental gears, internal and external gears including spur gears, bevel gears, and the like, in all of which provision is made for what may be termed the elastic transmission of power.

An important object of my invention, therefore, is to produce gear teeth which lend themselves admirably to precision work, which are highly resistant to breakage or wear, and which, when in mesh with each other, have full, intimate contact over substantial areas, uniformly distributing the transmitted power over the contact area and making possible elastic and even transmission of power; which prevent local overloading and attendant break-down of the crystal structure of the tooth metal, which substantially avoid all play, whip and back-lash, whereby abrupt shock is substantially eliminated in starting, stopping, changing speed, or reversal of direction of rotation.

Another object of my invention is to produce gear teeth of the general type described hereinbefore, which lend themselves admirably to exact heat treatment so that even tempering may be obtained throughout the teeth, thereby minimizing internal stresses of thermal origin; the construction being such that local over-stressing of the crystal structure at any point within the teeth is effectively avoided, and the possibility of random fracture lines is substantially eliminated.

A still further object of my invention, particularly as concerns one embodiment disclosed herein, is to permit slight lateral movement of the contact surface of a tooth, upon meshing with a cooperating tooth, to adapt the first tooth exactly to the contact surface of the second tooth.

Other objects and advantages will in part be obvious and in part pointed out hereinafter in connection with the following description, taken in light of the accompanying drawing.

Accordingly, my invention resides in the several elements and features of construction, and in the relation of each of the same to one or more of the others, all as described herein, the scope of the application of which is recited in the claims appended to this application.

In the drawing, wherein are disclosed several embodiments of my invention which I prefer at present, Figure 1 is a fragmentary front elevation showing a segment of a gear, the teeth of which are constructed in accordance with my invention; Figure 2 shows in perspective a single tooth of the gear according to Figure 1; Figure 3 is a fragmentary front elevation of a rack embodying my invention, while Figure 4 is a fragmentary perspective view showing a single tooth of the rack according to Figure 3; Figure 5 is a fragmentary front elevation illustrating a segment of a gear employing a variant of my invention, while Figure 6 is a corresponding perspective view of a single tooth of the said rack; while Figure 7 is a fragmentary front elevation of a rack embodying a variation of my invention; Figure 8 illustrating in perspective, a single tooth embodying such construction, and Figure 9 is a perspective of a single tooth of a further embodiment carrying out my invention.

To facilitate more thorough and complete understanding of my invention, it may be noted at this time that considerable difficulty has been encountered in the construction of gearing, particularly in the design of the gear teeth so the cooperating gear teeth will intermesh in accurately predetermined manner over a bearing surface of sufficient area to ensure proper distribution of load. Only slight irregularities will result in failure of the teeth to mesh properly, and will cause build-up of stress locally at the point of contact to an extent such that local failure results, whereby eventually either the teeth will wear rapidly and unevenly, giving rise to detrimental back-lash, or in extreme cases one or more of the teeth will fail entirely and abruptly, depending upon the manner in which the local failure occurs.

From the very beginning, therefore, considerable study and research has been directed to the proper design of gear teeth, aimed at ensuring proper contact of meshing gear teeth throughout their entire period of engagement. During the course of such study the involute gear now so widely employed as the basis for tooth construction, was evolved. Even here, however, it has proven impossible from a practical standpoint to ensure that each tooth of a particular gear member will cooperate in ideal manner with the associated tooth of a cooperating gear. Back-lash cannot be entirely eliminated, and to that extent definite limitations are imposed on the accuracy of the work, in the production of which such gearing is employed.

It is a further object of my invention, therefore, to eliminate a number of the defects and disadvantages pointed out in the foregoing and substantially to minimize others of those defects and deficiencies, and to evolve a gear tooth construction in which intimately and accurately predetermined engagement of meshing gear teeth over a comparatively large bearing area is substantially assured.

Additionally, it has been found that although in many instances it has been highly desirable to produce gearing which would operate without clash or clatter—which in other words would be comparatively silent—extreme difficulty has been encountered in producing such gears, and resort has been made to comparatively complicated gearing such as bevel, screw gearing, and the like, perhaps operating in oil; with noise by no means entirely eliminated even when such elaborate constructions are resorted to.

Additionally, difficulty has been experienced in producing power transmission through gearing which responds instantly to increased torque demands of the load. This difficulty may be due in part to the inability of the gear teeth heretofore employed, rigidly constructed, to adapt themselves quickly (if at all) in sensitive manner to the changed area of contact of the intermeshing teeth along their tooth faces incident upon change in load conditions, as a result of which local over-loading quite likely may occur. Consequent wear and mal-adjustment and back-lash are inevitable.

A further object of my invention, therefore, is to eliminate in large measure the aforementioned difficulties and disadvantages, and to produce a gear tooth which is substantially silent under all conditions of operation, and which adapts itself readily and instantly to variation, in the power transmitted, and which is particularly advantageous for use where the power is intermittent.

With the foregoing advantages and objectives in mind, reference may now be had to the following description, taken in light of the accompanying drawing. In Fig. 1 my invention is illustrated as applied to a segment of a conventional spur gear 10. It of course will be understood, however, that my invention can be adapted to almost any of the known types of gearing, including bevel, skew and screw gearing, of practically all types and descriptions. My invention has particular application, however, to spur gearing, and the detailed description in this specification will be directed almost exclusively to that type of gearing. Following the detailed description hereinafter made, however, the application of the invention to types of gearing other than spur gearing will be readily apparent to those skilled in the art, and such broad utilization falls within the purview of my invention.

A number of gear teeth 11 are disposed about the periphery of the gear 10. Preferably, although not necessarily, these gear teeth are involute gears. It is obvious, of course, that any other conventional lay-out of the gearing may be employed, if desired. The pitch circle is indicated at 12, the tooth flank at 13, the tooth face at 14, and the top land of the tooth at 15. The root circle is indicated at 6, while the root or dedendum, i. e. the distance between the pitch and root circles, is indicated at 17. Similarly, the addendum, or distance between the addendum circle 18 and pitch circle 12, is indicated at 19.

The important feature of my invention is that a slot 16 extends through the gear tooth, down to a point below the pitch circle, but short of the root circle. This slot may extend either longitudinally or transversely of the gear top land, and may extend either intermediate the limiting gear faces of the particular tooth, or entirely through the tooth. In the instance under discussion, the slot 16 extends longitudinally of the gear tooth, and as shown, in Figure 2, extends through the entire gear face 20 (Figure 2). This slot extends downward from the top land 15 to a distance approximately one-third of the dedendum, below the pitch circle. The depth of this slot is not highly critical, and some latitude either way is entirely permissible. I find, however, that if the length of the slot is substantially less than that desired, the nibs 14a, 14b do not display sufficient elasticity, while if the slot be deepened substantially below the terminal line herein described, the teeth themselves will be considerably weakened. My experience demonstrates that best results are obtained with a depth of slot substantially that referred to.

This longitudinal disposition of the slot divides the tooth into what might be called nibs 14a and 14b, to which nibs considerable relative elasticity is imparted. Thus, when a cooperating tooth, either of the same elastic construction or rigid, comes into contact therewith, the nibs 14a and 14b of tooth 11 are free to adapt themselves instantaneously and readily to the contours of the cooperating tooth, so that the best bearing or contact area is invariably found in substantially instantaneous manner. Thus minor eccentricities between the shafts of the respective gears, misalignments, etc. are compensated for, as are eccentricities of the gears themselves on their respective shafts. Of course more advantageous results are obtained when the teeth of both gears are of the bifurcated construction according to my invention than is true when the teeth of but one gear are slotted. This is because in the former instance the teeth lend themselves to more ready self-adjustment. However, I have obtained good results when but a single gear has teeth of the slotted construction aforesaid.

By readily yielding into the position where the load is more uniformly distributed over the nibs of the teeth these latter ensure that the power is transmitted through the gears in elastic manner. Distribution of wear over a comparatively large area and the absence of abrupt shock or blows results in minimum wear, gradual and slow in nature. Back-lash is substantially avoided. By consequence, meshing teeth having in elastic manner sought the position of most intimate inter-engagement, substantially no shock is encountered either when the gearing starts to rotate, when stopping occurs, when reversal in direction takes place, or when other changes in load conditions are observed. Local over-loading and breakdown is substantially entirely avoided.

It is evident that the slotted condition of the teeth facilitates heat treatment of the gears, so that even the innermost parts of the teeth are intimately exposed to the tempering heat. More uniform tempering and hardening thus is permissible than has heretofore been practical, whereby increased resistance to wear is observed and a more uniform product is obtained. The uniform treatment of the metal to the tempering heat substantially avoids internal stresses in the teeth due to non-uniform heating. A superior product follows.

Consideration will show that without some precautionary measure, difficulty may possibly be experienced in that binding between the walls of the slot 20 may occur at the bottoms thereof, thus restricting the adjusting action. Additionally, random fracture lines may generate from the bottom of the slots, making the teeth subject during operation to sudden and unexpected local failure. I find that these disadvantages can be readily suppressed simply by providing an enlarged, rounded bore 21 at the bottom of the slots 16. These slots may be formed in any desired manner, as by tapping, drilling, undercutting, or the like.

My invention is disclosed in Figures 3 and 4 as applied to the construction of the teeth of a rack. A fragmentary part of the rack is indicated generally at 22. This rack is provided with a plurality of gear teeth indicated generally at 24, and which are shown as being of generally truncated triangular cross section. The pitch line is indicated at 12. The top lands 25 of these teeth are slotted longitudinally at 16, these slots extending downwardly through the teeth a desired distance, comparing substantially to that indicated in connection with the embodiment in Figures 1 and 2. Slot 16 likewise terminates, in this embodiment, in an enlarged bore 21, just as in the first-described embodiment. In substantially all other respects, the construction of the embodiment now undergoing description is substantially the same, so far as concerns this invention, as that of the first-described embodiment.

While the constructions hereinbefore described, wherein the slots 16 extend either partly or entirely along the longitudinal extent of the gear teeth, give rise to ready adaptation of the teeth of one gear with the teeth of a cooperating gear in those instances wherein the shafts of those gears are in substantially parallel disposition, so that substantially all components of force are disposed normally to the shaft of the gears, there frequently occur instances where lateral components of force are introduced. This may occur, for example, when there exists some misalignment of the shafts of the gears, either intentionally, as in the instance of angularly disposed power take-off, or unintentionally, as in the case of wear of the bearings of the gear shafts. Other typical instances will readily suggest themselves. Where some lateral components of force are encountered, a sidewise thrust on the gear teeth takes place, ordinarily giving rise to abrupt and hammer-like contact of the meshing gear teeth, and accompanied by rapid wear of the teeth, with possible eventual failure, and with probable wear and tear on the bearings for the gear shafts.

I have discovered that if it be possible to impart some elasticity to the teeth of these gears, in a lateral direction, the wear resulting from these sidewise components of force will in large measure be suppressed. Contact between engaging or meshing teeth will be intimate and substantially silent, and the meshing teeth will almost instantaneously seek the position wherein greatest contact area and most uniform distribution of load result. Thus, except in those cases where the eccentricity between the cooperating gears is pronounced, highly satisfactory results are obtained, and elastic transmission ensues.

My investigations further demonstrated that the required elastic properties could be imparted to the gear teeth by disposing a slot, similar in construction to the slots heretofore described in connection with the embodiments of Figures 1 through 4, but disposed transversely across the gear faces at a point intermediate along its length, preferably at the midpoint. Such a construction is illustrated in Figures 5 and 6, in connection with a segment of a pinion gear shown generally at 26. This gear has a plurality of gear teeth indicated generally at 27. The gear teeth 27 are of generally involute construction. Just as in the case of the embodiment of Figures 1 and 2, the pitch circle is indicated at 12, the tooth flank at 13, the tooth face at 14, and the top land of the tooth at 15. The root circle is indicated at 6, while the root or dedendum, i. e. the distance between the pitch and root circles, is indicated at 17. Similarly, the addendum, or distance between the addendum circle 18 and pitch circle 12, is indicated at 19. In this instance, however, the slot 28 through the top land 15 extends transversely to the gear face 41 and is disposed at a point intermediate along the length of the latter, preferably at a point approximately midway of such length. The bottom of slot 28 is shown at 29, and may be either rounded, or if desired, of enlarged bore-like construction, similar to that described hereinbefore in connection with the embodiments of Figures 1 through 4. These slots preferably extend to a depth of approximately two-thirds of the total depth of the teeth, the factors controlling in connection with this design being substantially the same as those heretofore pointed out in connection with the design of the slots 16 of the teeth 11, Figure 1.

This transverse construction is indicated in Figures 7 and 8 in connection with its application to a rack. A fragmentary portion of the rack 30 is shown in Figure 7 as provided with a plurality of teeth 31 of truncated, triangular section. Other than this, the construction is substantially the same as that just described with respect to the segment of gear disclosed in Figures 5 and 6. The top land 32 of each gear tooth is provided with a transversely disposed slot 28, the bottom 29 of which extends substantially two-thirds the depth of each tooth.

It is apparent that if desired, and to lend added elasticity to the construction of Figures 5 through 7, wherein the slots are disposed transversely of the gear faces, additional slots 28 may be provided, disposed either symmetrically or assymetrically (perhaps in accordance with empirical data), along the lengths of the gear faces. Should additional slots be employed, disposed in accordance with the above teaching, then it is possible, if desired, to decrease the depth of these slots in order to impart requisite strength to the teeth, reliance being placed upon the additional number of slots to give required elasticity to the construction.

In Figure 9 there is illustrated a further embodiment of my invention in which the slot while extending longitudinally of the top land of the gear, does not extend entirely throughout the length of such land but only partly along the longitudinal extent thereof. As shown in this figure the slot 16' extends about halfway through the longitudinal length of the top land 15'. 14' represents the face of the gear tooth itself and in general, the illustration is similar to Fig. 2.

It is likewise apparent that if desired, and to provide almost universal elasticity of the gear teeth, that is, to provide for slight yielding to thrust from almost any direction, the gear teeth may be provided with both longitudinal and transverse slots. It is apparent upon consideration of the foregoing that gearing embodying my new invention quickly adjusts itself to the instantaneous load conditions, and transmits torque in the substantial absence of noise in sensitive response to variations in loads, direction of rotation, etc., all in the substantial absence of wear. Such gearing is particularly adaptable to work conditions where precision service is at a premium, or where the load demands are intermittent, or both.

Where, in the following claims, I use the term "gear," this term is employed in its most inclusive sense, including all forms of gearing, as for example, racks, pinions, internal and external gears, and the like.

I claim:

1. A gear having a plurality of gear teeth, each tooth having a top land and being provided with a slot which extends downwardly from the top land to a point below the pitch circle of the gear but short of the root circle of the gear, each said slot terminating at the bottom thereof in an enlarged circular bore, whereby elasticity is imparted to the respective teeth.

2. The construction recited in claim 1, said point being located at a distance substantially one-third of the dedendum below the pitch circle.

3. A gear having a plurality of gear teeth, each tooth having a top land and being provided with a slot along the entire gear face, said slot extending downwardly from the top land to a point below the pitch circle of the gear but short of the root circle of the gear, each said slot terminating at the bottom thereof in an enlarged circular bore, whereby elasticity is imparted to the respective teeth.

4. A gear having a plurality of gear teeth, each tooth having a top land and being provided with a slot which extends longitudinally partly through the extent of said top land, said slot extending downwardly from the top land to a point below the pitch circle of the gear but short of the root circle of the gear, each said slot terminating at the bottom thereof in an enlarged circular bore, whereby elasticity is imparted to the respective teeth.

5. A gear having a plurality of gear teeth, each tooth having a top land and being provided with a slot which extends longitudinally along the entire extent of said top land, said slot extending downwardly from the top land to a point below the pitch circle of the gear but short of the root circle of the gear, each said slot terminating at the bottom thereof in an enlarged circular bore, whereby elasticity is imparted to the respective teeth.

6. A gear having a plurality of gear teeth, each tooth having a top land and being provided with a slot which extends transversely across said top land, said slot extending downwardly from the top land to a point below the pitch circle of the gear but short of the root circle of the gear, each said slot terminating at the bottom thereof in an enlarged circular bore, whereby elasticity is imparted to the respective teeth.

ANTOINE GAZDA.